(12) United States Patent
van Meerveld et al.

(10) Patent No.: US 6,395,222 B1
(45) Date of Patent: May 28, 2002

(54) METHOD FOR PRODUCING A HOSE COUPLING AND A HOSE COUPLING

(75) Inventors: Marten van Meerveld, Hengelo; Laurentius A. G. Mentink, Haaksbergen, both of (NL)

(73) Assignee: Actuant Corporation, Glendale, WI (US)

( * ) Notice: Subject to any disclaimer, the term of this patent is extended or adjusted under 35 U.S.C. 154(b) by 0 days.

(21) Appl. No.: 09/549,419

(22) Filed: Apr. 14, 2000

Related U.S. Application Data

(63) Continuation of application No. PCT/NL98/00595, filed on Oct. 16, 1998.

(30) Foreign Application Priority Data

Oct. 17, 1997 (NL) .............................................. 1007304

(51) Int. Cl.⁷ .................................................. B22F 3/12
(52) U.S. Cl. ......................................... 419/36; 419/38
(58) Field of Search ..................................... 419/36, 38

(56) References Cited

U.S. PATENT DOCUMENTS

| | | | | |
|---|---|---|---|---|
| 4,429,018 A | * | 1/1984 | Stuemky | 428/546 |
| 5,403,046 A | * | 4/1995 | Kooten | 285/319 |
| 5,566,920 A | | 10/1996 | Romann et al. | 251/129.21 |
| 5,666,633 A | | 9/1997 | Arnold et al. | 419/10 |

FOREIGN PATENT DOCUMENTS

DE 28 49 133 A1 5/1980

OTHER PUBLICATIONS

PCT Search Report for parent International Application PCT/NL98/00595 and Search Report for priority application NL 1007304 with English translation.

* cited by examiner

*Primary Examiner*—Ngoclan Mai
(74) *Attorney, Agent, or Firm*—Quarles & Brady LLP

(57) ABSTRACT

A method for producing a metal hose coupling which is designed to be mounted permanently on the end of a hose for pressurized hydraulic oil, which hose coupling creates a fluid connection between the hose and an attachment member, the hose coupling having at least one hose nipple which, in the fitted state, projects into the hose and a connecting part, which is designed to form a connection to the attachment member, the hose coupling furthermore comprising, for each hose nipple, a deformable sleeve which, in the fitted state, rests around that part of the hose which has been pushed onto the hose nipple and, with deformation to the sleeve, holds the hose on the hose nipple, an oil passage extending through the connecting part and the at least one hose nipple. The connecting part and the hose nipple are produced as a single-piece body by means of the metal injection moulding process.

4 Claims, 1 Drawing Sheet

METHOD FOR PRODUCING A HOSE COUPLING AND A HOSE COUPLING

CROSS-REFERENCE TO RELATED APPLICATIONS

This is a continuation application of PCT/NL98/00595 filed Oct. 16, 1998.

FIELD OF THE INVENTION

The invention relates to a method for producing a metal hose coupling which is adapted to be mounted permanently on the end of a pressure hose for pressurized hydraulic oil, which hose coupling then can create a fluid connection between the hose and an attachment member, the hose coupling having at least one hose nipple which, in the fitted state, projects into the hose and a connecting part, which is designed to form a connection to the attachment member, the hose coupling furthermore comprising, for each hose nipple, a deformable sleeve which, in the fitted state, rests around that part of the hose which has been pushed onto the hose nipple and, with deformation to the sleeve, holds the hose on the hose nipple, an oil passage extending through the connecting part and the at least one hose nipple.

The present invention also relates to a hose coupling which is produced using the method according to the invention.

BACKGROUND OF THE INVENTION

Metal hose couplings are generally known for the purpose of coupling hydraulic pressure hoses, which are usually provided with a reinforcement, to an attachment member, such as a hydraulic pump, a valve, a cylinder, etc.

NL 1001273 and DE 28 49 133 show 90° elbow hose couplings with a single hose nipple which is at right angles to the connecting part, which is designed as an insertion part.

Hitherto, two components, namely the hose nipple and the connecting part, have been used as a basis for the production of hose couplings of this nature. In this case, the connecting part is provided with a hole for accommodating the hose nipple. These two components are joined together by hard soldering in order, on the one hand, to create a strong bond between the two components and, on the other hand, to create a seal between the two components which is able to withstand the high pressure of the hydraulic oil.

Hard soldering has the drawback that it is impossible to see from the outside whether the connection between the hose nipple and the connecting part is liquid-tight. For this reason, each hose coupling has to be tested separately for leaks, and even then there is still the problem that the ability to withstand a brief pressure test does not definitively mean that the soldered seam will remain sealed for a prolonged period. Subsequent leakage may occur in particular under the influence of vibrations.

A further drawback is that solder may enter the passage in the hose coupling. If this passage has a small cross section, for example of 1 to 2 millimeters, this may lead to the passage becoming blocked. Furthermore, solder which has entered the passage may become detached over the course of time and may then have an adverse effect on, for example, the action of valves in the hydraulic system.

Moreover, hard soldering is an expensive process, since the soldering of hose couplings of this nature has to take place in a furnace in which there is a vacuum or an inert gas present.

OBJECT OF THE INVENTION

The object of the present invention is to propose measures which provide an improved hose coupling and, at the same time, enable the cost price to be reduced.

SUMMARY OF THE INVENTION

The present invention provides a method for producing a hose coupling having a connecting part and at least one hose nipple, which hose coupling is produced as a single-piece body by means of the metal injection moulding process.

The present invention is based on the insight that the metal injection moulding process, which is known per se, can be used to produce a single-piece body with the tolerances required for hose couplings. Since this process comprises the injection moulding of a preform, there is a risk of burrs being formed on the product obtained. Burrs in hose couplings are particularly undesirable on the surface of the hose nipple, since the hose would then press on such a burr with a great pressure, and would then be cut into, leading to leakage.

It has been found that the method according to the invention is able to provide a hose coupling without subsequent machining being required in order to remove any burrs.

As is known, injection moulding results in the formation of burrs as a result of the mould parts not completely adjoining one another. Consequently, a preferred embodiment of the invention provides for the contact surfaces of the injection mould parts along the edges which form the mould cavity for the hose nipple to be locally raised, for example by $1/100$th millimeter. As a result, the mould-closing force is concentrated at these edges and the formation of burrs on the hose nipple is avoided.

In combination with the use of an injection mould of this nature, or as a separate measure, it is then possible for the preform obtained by injection moulding to be brushed with a soft brush prior to sintering. In this way, projecting burrs are easily removed without damage to the preform.

It has therefore proven possible for the metal injection moulding process to be carried out in such a way that no further machining is required in order to remove burrs. It will be clear that, by making use of the metal injection moulding process, which is known per se, all the drawbacks of the known production method referred to in the introduction are eliminated.

The method according to the invention is particularly advantageous for the production of "angled" hose couplings, in which the at least one hose nipple does not lie in line with the connecting part, but obviously it is also advantageous for the production of straight hose couplings.

In a preferred embodiment, the invention provides for the single-piece body of the hose coupling to be made from stainless steel, preferably RVS 316, so that there is no longer any need for a separate treatment in order to achieve the desired resistance to corrosion.

The present invention also relates to a hose nipple produced using the metal injection moulding process.

The present invention will be explained below with reference to the drawings.

DESCRIPTION OF THE PREFERRED EMBODIMENT

Figure 1:
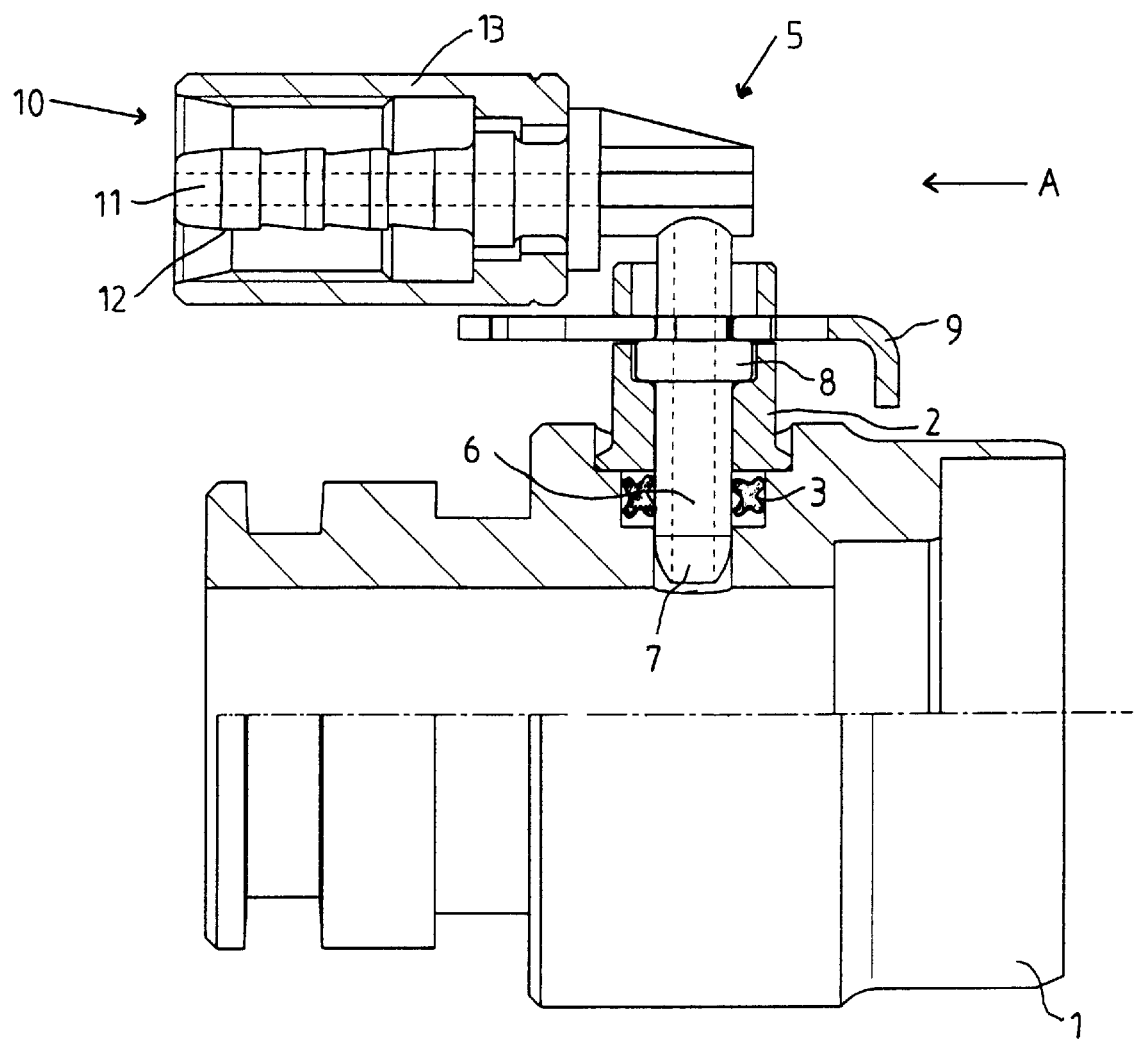
FIG. 1 diagrammatically depicts a cross section through a gland of a hydraulic cylinder which is coupled to a hose coupling according to the invention, and FIG. 2 diagrammatically depicts a view, in the direction of arrow A in FIG. 1, of the single-piece body of the hose coupling shown in FIG. 1.
Figure 2:
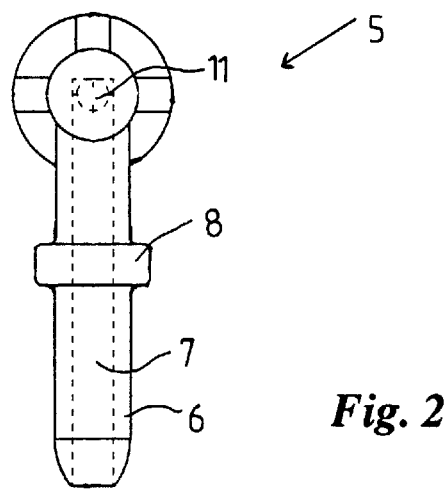

FIG. 1 shows, partially in cross section, a gland 1 of a linear hydraulic cylinder (not shown). An attachment bush 2, in which there is an axial bore lying in line with a radial bore in the gland, is arranged on the gland 1. These aligned bores form an insertion bore for a metal hose coupling, which in this case is denoted overall by reference numeral 5.

The metal hose coupling 5 comprises an insertion part 6, which is designed to connect the hose coupling 5 to the gland 1. The insertion part 6 is substantially a cylindrical tube part with an internal passage 7 and a thick rim 8 on the outside. A two-limbed clamp 9 rests over the thick rim 8 when the insertion part 6 has been fitted into the insertion bore 3. In this case, each limb of the clamp 9 fits through a transverse slot in the attachment bush 2.

The hose coupling 5 furthermore comprises a hose nipple 10 with an internal passage 11, which hose nipple adjoins the insertion part 6 at right angles, in such a manner that the internal passage 11 is in communication with the internal passage 7 in the insertion part 6. As is customary, the hose nipple 10 is provided with ribs 12 in order to hold the pressure hose (not shown) securely in place.

The hose coupling 5 also comprises a deformable metal sleeve 13, which rests around that part of the hose which has been pushed onto the hose nipple 10 and is intended to be compressed, so that the hose is clamped firmly between this sleeve 13 and the hose nipple 10.

The hose nipple 10 and the insertion part 6 form a single-piece body which is produced by means of the metal injection moulding process. In the metal injection moulding process, an injection-mouldable mass is made from a metal powder, which mass is then injected under pressure into a suitable mould. The shape of the mould cavity in the mould corresponds to the shape of the body of the hose coupling. The preform or green part obtained is then sintered at high temperature, so that the body acquires a high strength and density.

If appropriate, the metal powder may be mixed with a binder, for example a plastics material, which binder is then removed from the preform prior to sintering, for example by the preform being heated.

Preferably, the body of the hose coupling 5 is made from a stainless steel, in particular RVS 316, since in this case no further treatment of the hose coupling 5 is required in order to achieve the desired resistance to corrosion.

As has been stated, the hose coupling according to the invention may also adopt a different form, for example may be a T-coupling. Furthermore, the connecting part of the hose coupling, which in this example is an insertion part, may also be designed differently, for example as a bayonet connection.

What is claimed is:

1. A method for producing a metal hose coupling which is adapted to be mounted permanently on the end of a hose for pressurized hydraulic oil, which hose coupling then creates a fluid connection between the hose and an attachment member, the hose coupling having at least one hose nipple which, in the fitted state, projects into the hose and a connecting part, which is adapted to form a connection to the attachment member, the hose coupling furthermore comprising, for each hose nipple, a deformable sleeve which, in the fitted state, rests around that part of the hose which has been pushed onto the hose nipple and, with deformation to the sleeve, holds the hose on the hose nipple, an oil passage extending through the connecting part and the at least one hose nipple, wherein said method comprises the step of producing the connecting part and the hose nipple as a single-piece body by means of a metal injection moulding process.

2. A method according to claim 1, which method comprises the steps of creating an injection-mouldable mass based on a metal powder, injection moulding the mass into a suitable injection mould, so that a preform is obtained, and sintering the preform obtained through injection moulding.

3. A method according to claim 1, which method comprises the steps of creating an injection-mouldable mass based on a metal powder by mixing metal powder with a binder, injection moulding the mass into a suitable injection mould, so that a preform is obtained, and sintering the preform obtained through injection moulding, wherein the binder is removed after injection moulding and before sintering.

4. A method according to claim 1, which method comprises the steps of creating an injection-mouldable mass based on a stainless steel powder, injection moulding the mass into a suitable injection mould, so that a preform is obtained, and sintering the preform obtained through injection moulding.

* * * * *